UNITED STATES PATENT OFFICE.

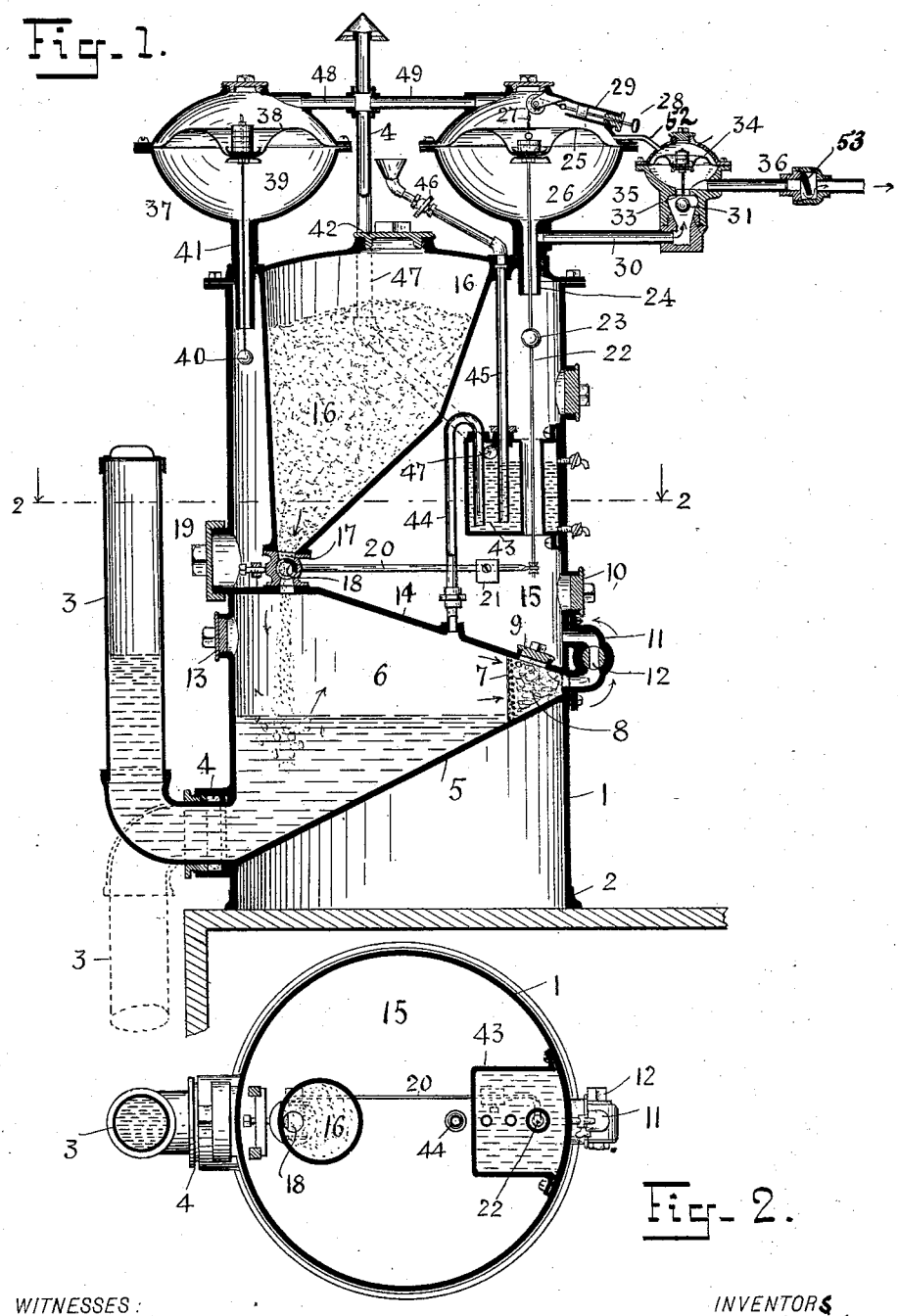

ALEXANDER KEITH AND JAMES HENRY BYRNE, OF TORONTO, CANADA.

ACETYLENE-GAS GENERATOR.

SPECIFICATION forming part of Letters Patent No. 608,460, dated August 2, 1898.

Application filed May 6, 1897. Serial No. 635,287. (No model.)

*To all whom it may concern:*

Be it known that we, ALEXANDER KEITH, a subject of the Queen of Great Britain, and JAMES HENRY BYRNE, a citizen of the United States of America, both residing at Toronto, in the Province of Ontario and Dominion of Canada, have invented certain new and useful Improvements in Gas-Generators; and we do hereby declare the following to be a full, clear, and exact description of the invention, such as will enable others skilled in the art to which it appertains to make and use the same.

Our invention relates to the generation of acetylene gas; and it consists of an improved apparatus for automatically generating any given quantity of said gas when a demand for the same arises. The apparatus heretofore designed for this purpose has consisted of various forms of mechanism in which a regulated supply of water or other liquid has been admitted to act upon a given quantity of carbid of calcium or other material for the like purpose stored in the apparatus, and the disadvantages have been extremely unequal action, difficulty in stopping the generation of gas quickly, and inequalities and uncertainties of operation, which have in many cases given rise to dangerous explosions. We obviate all these difficulties in our apparatus by reversing the arrangement and employing the carbid of calcium in a pulverized or granulated form and feeding the same in nicely-graduated quantities to a water-tight generator-chamber containing a given quantity of water. A valve controlling the flow of the pulverized or granulated carbid of calcium to the generating-chamber is automatically controlled by a pressure-governor, so that any variations in the supply of gas required at the service-pipe are promptly met by variations in the rate of generation.

The preferred form of our apparatus is illustrated in the accompanying sheet of drawings, in which—

Figure 1 is a longitudinal section of our apparatus, and Fig. 2 is a horizontal section on lines 2 2 of Fig. 1.

Throughout the drawings like reference-figures refer to like parts.

1 represents the main shell of the generator, which is gas and water tight and rests upon a foundation 2.

3 is a feed-pipe for the water-tight generating-chamber in the base of the generator proper. This pipe has a swivel-joint at 4 by which it may be turned down, so as to empty said generating-chamber. To insure the complete emptying of the generating-chamber, its floor 5 is preferably inclined, as shown, although this is not a necessity. At one side of the generating-chamber 6 a small portion is partitioned off by perforated partition 7, and in this condensing-chamber 8 thus formed is placed any suitable substance for washing and purifying the gas.

9 is a small hand-hole in the upper wall 14 of the generating-chamber, and 10 is a larger hand-hole in the side of the shell 1, through which the contents of the condensing-chamber 8 may be renewed and removed.

11 is a pipe or by-pass from the condensing-chamber 8 to the storage-chamber 15, and 12 is a valve which opens or closes said by-pass.

13 is the hand-hole giving access to the generating-chamber.

16 is a magazine or hopper for pulverized or granulated carbid of calcium or other gas-forming material. This magazine has an outlet 17, which discharges into the generating-chamber. This outlet or discharge is controlled by any suitable form of valve 18.

19 is a hand-hole in the side of the generator, which gives access to said valve.

20 is a lever operating valve 18, which has the adjustable weight 21 placed thereon.

22 is a wire or rod carrying the weight 23, which is so shaped as to close the orifice of the pipe 24 when drawn up against it. The upper end of the rod or wire 22 is connected with the flexible diaphragm 25, arranged in the governor-chamber 26. 27 is a wire or chain leading over the small pulley in the top of this chamber and to the adjustable rod 28, which slides in and out in the small tube 29, extending through the upper wall of the governor.

30 is a service-pipe through which the gas generated is discharged to the system of pipes which it is to supply, and between this pipe 30 and its extension 36 is placed the valve 31, which is supported on the flexible diaphragm 34 in the small governor-chamber 35 and has seat 33 above it.

37 is an excess governor chamber or reservoir, having a flexible diaphragm 38 mounted therein, which is weighted by means of the rod 39 and weight 40. The weight 40 is also shaped so as to close the orifice to the tube 41, leading to the surplus-reservoir 37 when drawn up against it.

42 is a hand-hole through which the magazine may be filled.

43 is a water-trap or water seal which performs the double function of a graduated governor for the discharge-pipe and a trap for preventing the admission of air into the generator. This apparatus consists of a closed chamber into which the pipe 44 from the generating-chamber is led, the discharge end of said pipe being at a given distance below the level of the water in the chamber 43. 45 is a pipe for filling this water-trap, having the valve 46 and the funnel at the upper end.

47 is a discharge-pipe leading from the upper portion of the water-trap, above the water-level, to the external air or to the chimney-flue. 48 and 49 are branches thereof supplying the atmospheric air to the upper portion of the governor 26 and the surplus storage-reservoir 37. 52 is an air-duct between the two upper chambers of the governors 26 and 35. 53 is a check-valve on the service extension-pipe 36.

The operation of our invention is as follows: Water or other liquid is introduced into the generating-chamber till it reaches the height of the water-line shown, and also in the water-trap 43. Before the magazine 16 is filled with pulverized or granulated carbid of calcium the valve 18 is closed by the drawing out of the slide 28 and consequent lifting of the rod 22 until the valve 23 closes the outlet through the pipe 24. The magazine is then filled, and the apparatus will remain in this condition any length of time. When gas is to be generated, the following takes place: The slide 28 is pushed in, permitting the lever 20 to drop and opening the valve 18. Pulverized or granulated carbid begins to drop into the generating-chamber at a given speed. Acetylene gas is generated and passes through the scrubber 8, pipe 11, into the storage-chamber 15, and up through the pipe 24, and service-pipe 30, passing through the service-pipe 36 to the burner.

If more gas is generated than is being consumed, pressure will accumulate in the reservoir 15 and, extending up into the governor 26, lift the diaphragm 25, and with it the lever 20, partly closing the valve 18. If pressure goes on increasing, the valve will eventually close, and at the same time the outlet 24 will be closed by the valve 23, thus preventing any further expansion extending out into the service-pipe. Any further increase of pressure will force the gas into the excess-governor chamber 37, and still further increase of pressure through the pipe 44 into the water-trap 43, from whence it will pass to the outer air by the discharge-pipe 47. The valve 31 being lighter than the valve 23, any slight variations in pressure due to inequalities of action of the generating-chamber or inequalities of consumption in the service system will cause the diaphragm 34 to rise and fall before diaphragm 25 is affected. Thus these slight variations will not affect the steadiness of the generating mechanism. The surplus gas generated one moment will be given up again at the next moment, so the pressure is retained at a constant figure until the variation exceeds a given amount, when the valves 18 and 23 will be operated as before described.

The water-trap 43 prevents the admission of air to the generator through the discharge-pipe by backward flow from the discharge-pipe. When the machine is shut off, the hinge-valve 53 will close on its seat, thereby acting as a check-valve to prevent any backward flow of air to the machine from the service-pipe.

In case there is any continued excess of pressure due to considerable inequality in the generating action this will lift the diaphragm 38 and the surplus gas will be stored in chamber 37. The valve 23 will continue to open and close, letting off the gas into the service-pipe at proper pressure until this surplus is used up, when both diaphragms 38 and 25 will fall and normal operation be resumed.

Of course numerous variations could be made in the details of our apparatus without departing from the spirit of our invention. The form of the magazines and chambers might be varied so long as their relative arrangement was retained. Other forms of valves might be employed and other forms of pressure-governors substituted; but so long as the principle of operation herein described is retained the resulting apparatus will be within the scope of our invention.

The air-duct 52 is for the purpose of admitting air to or from the upper sections of the governor-chambers 26 and 35 to allow the diaphragm in either chamber to expand and contract without any undue pressure being made on their surfaces.

An important feature of our invention is the combination of the throttling-valves controlled by a governor controlled by the varying volume and pressure of the gas generated, the variable governor-chamber being connected with the service-pipe beyond the valve. When two such governors as 26 and 35 are connected one beyond the other, the second one being the more sensitive, a still more perfect result is obtained. Each apparatus acts as a compensating expansion-chamber up to a certain point. When that point (the maximum capacity of the chamber) is reached, the valve closes. The gas trapped in the chamber continues to supply the service-pipe 36, and in an instant it has reduced in pressure enough to open valve 31. This admits more gas and the valve continues to open and close alternately, admitting small quantities of gas, this intermittent action being equalized by the elasticity of the gas in the governor, so that a mean pressure is maintained in the pipe 36. If this excess of pressure continues, governor 26 begins to operate in the same manner, thus limiting the variations to which the smaller governor 35 is subjected. Moreover, the bringing of the larger governor 26 into operation closes the valve 18 and within a limited period assures a cessation of gas generation, so that the normal pressure will be reëstablished. As before explained, the surplus-governor 37 takes care of any ordinary surplus generated before the cessation of the generating action and gives it up again when normal pressure is reëstablished. Of course the sensitiveness of each governor depends on the ratio of the area of the diaphragm to the weight carried thereby.

Removable weights may be placed on top of each governor-diaphragm, as shown.

Having therefore described our invention, what we claim as new, and desire to protect by Letters Patent, is—

1. In a gas-generator, the combination of the water-tight generating-tank, the magazine for pulverized or granulated materials so arranged that said magazine discharges into the generating-tank above the water-level, a system of two pressure-governors, each consisting of a variable chamber through which the gas passes on its way to the service system, a valve controlling the admission of gas from the generator to each of said chambers, and means whereby the expansion of the walls of said chamber closes said valve, the governor nearest the generator being less sensitive than the other, together with means for regulating the admission of the pulverized or granulated material to the generating-tank controlled by the expansion of the less sensitive governor, substantially as described.

2. In a gas-generator, the combination of the water-tight tank, the magazine for pulverized or granulated materials, so arranged that said magazine discharges into the generating-tank above the water-level, a system of two pressure-governors, each consisting of a variable chamber through which the gas passes on its way to the service system, a valve controlling the admission of gas from the generator to each of said chambers, and means whereby the expansion of the walls of said chamber closes said valve, the governor nearest the generator being less sensitive than the other, together with means for regulating the admission of the pulverized or granulated material to the generating-tank controlled by the expansion of the less sensitive governor, a blow-off pipe which leads from the generating-chamber to the open air, and a governing device connected therewith arranged to discharge only above a predetermined pressure, substantially as described.

3. In a gas-generator, the combination of the water-tight generating-tank, the magazine for pulverized or granulated material above the same, the valve controlling the flow of material from the magazine to the gas-generating chamber, the governor which has a movable diaphragm which is acted upon by the gas-pressure in the generator, and connections whereby the valve is controlled by the movements of the diaphragm, together with a valve in the service system, the second governor controlling the same, and into and through which second governor the gas passes from the first governor, said second governor operating under less variations of pressure than does the first governor, substantially as described.

4. In a gas-generator, the combination of the generating apparatus and means whereby the rate of generation is controlled, the governor operated by pressure from within the generator to control said means, and the expansible surplus storage-chamber, with means controlling the inflow of gas thereto, which means are also controlled by the gas-pressure within the generator, but graduated to operate only at greater variations of pressure than are necessary to affect the governor, substantially as described.

5. In a gas-generator, the combination of the generating-chamber, the storage-chamber, the connection between the two and the condensing-chamber located in the line of said connection and a strainer in said condensing-chamber, together with the water seal and the pipe leading directly from the generating-chamber to the water seal, substantially as described.

6. In a gas-generator, the combination of the generating apparatus, the two governors connected to the service system, operating-valves therein, and operated by flexible diaphragms actuated by the gas passing through said service system, the governor nearest the generator being the less sensitive of the two, together with the means for controlling the rate of gas generation, said means being operated by said less sensitive governor, substantially as described.

In testimony whereof we affix our signatures in the presence of two witnesses.

ALEXANDER KEITH.
JAMES HENRY BYRNE.

Witnesses:
 W. M. MERRITT,
 A. E. PEGLAR.